US012679228B2

(12) United States Patent (10) Patent No.: US 12,679,228 B2

Segawa (45) Date of Patent: Jul. 14, 2026

(54) ELECTRIFIED VEHICLE

(71) Applicant: TOYOTA JIDOSHA KABUSHIKI KAISHA, Toyota (JP)

(72) Inventor: Takeo Segawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/741,776

(22) Filed: Jun. 13, 2024

(65) Prior Publication Data

US 2025/0065735 A1 Feb. 27, 2025

(30) Foreign Application Priority Data

Aug. 23, 2023 (JP) ................................. 2023-135630

(51) Int. Cl.
B60L 50/60 (2019.01)
B60L 50/53 (2019.01)

(52) U.S. Cl.
CPC .............. B60L 50/66 (2019.02); B60L 50/53 (2019.02); *B60L 2210/40* (2013.01); *B60L 2240/423* (2013.01)

(58) Field of Classification Search
CPC ...... B60L 50/66; B60L 50/53; B60L 2210/40; B60L 2240/423
See application file for complete search history.

(56) References Cited

U.S. PATENT DOCUMENTS

2019/0260319 A1* 8/2019 Gagas ..................... H02P 21/22
2019/0346287 A1* 11/2019 Koike ................... G01D 5/245

FOREIGN PATENT DOCUMENTS

JP 2004034816 A * 2/2004
JP 3801731 B2 * 7/2006
JP 2021-005944 A 1/2021
JP 2022-182013 A 12/2022

* cited by examiner

*Primary Examiner* — Syed O Hasan
(74) *Attorney, Agent, or Firm* — SoraIP, Inc.

(57) ABSTRACT

Electrified vehicle includes a motor, a battery, an inverter, and a control device. The inverter is provided between the battery and the motor, and converts DC power from the battery into AC power. AC power is supplied to the motor. The control device can execute a specified operation while electrified vehicle is stopped. The specific operation includes determining a target electrical angle based on an initial value of the electrical angle of the motor, controlling the operation of the inverter to start energizing the motor with a predetermined rated current, identifying generated torque in the motor based on the rated current and the current value of the electrical angle, determining feedback torque for damping based on a deviation of the current value with respect to the target electrical angle, and controlling an energizing current to the motor based on the generated torque, the feedback torque, and the rated current.

4 Claims, 5 Drawing Sheets

(COMPARATIVE EXAMPLE)

TIME [s]

TIME [s]

(SECOND EMBODIMENT)

ELECTRIFIED VEHICLE

CROSS-REFERENCE TO RELATED APPLICATION

This application claims priority to Japanese Patent Application No. 2023-135630 filed on Aug. 23, 2023, incorporated herein by reference in its entirety.

BACKGROUND

1. Technical Field

The technique disclosed herein relates to an electrified vehicle.

2. Description of Related Art

Japanese Unexamined Patent Application Publication No. 2022-182013 (JP 2022-182013 A) discloses an electrified vehicle including a motor that drives wheels of the electrified vehicle, a battery that supplies power to the motor, an inverter, and a control device that controls operation of the inverter. The inverter is provided between the battery and the motor, and converts direct-current (DC) power from the battery into alternating-current (AC) power. AC power is supplied to the motor.

In the electrified vehicle, the motor is occasionally energized while the electrified vehicle is stopped. When the motor is energized, generated torque corresponding to the electrical angle of the motor is generated. There is an electrical angle at which no torque is generated even when the motor is energized. When generated torque is generated by the motor, the electrical angle of the motor fluctuates substantially around the electrical angle at which no torque is generated. Accordingly, torque fluctuations occur in the motor, and the electrified vehicle vibrates. In the electrified vehicle according to JP 2022-182013 A, generation of vibration in the stationary electrified vehicle is suppressed by adjusting the electrical angle at the time when the electrified vehicle is stopped.

SUMMARY

The present specification provides a novel technique of suppressing vibration generated in a stationary electrified vehicle.

A first aspect disclosed herein provides an electrified vehicle including:

a motor that drives wheels of the electrified vehicle; a battery that supplies power to the motor;

an inverter provided between the battery and the motor to convert direct-current power from the battery to alternating-current power to be supplied to the motor; and a control device that controls operation of the inverter, in which:

the control device is capable of executing specific operation with energization of the motor with the electrified vehicle stopped; and the specific operation includes determining a target electrical angle for an electrical angle of the motor based on an initial value of the electrical angle, starting energization of the motor at a predetermined rated current by controlling the operation of the inverter, specifying generated torque generated by the motor based on the rated current and a present value of the electrical angle, determining feedback torque for suppressing vibration based on a deviation of the present value from the target electrical angle; and controlling an energization current for the motor based on the generated torque, the feedback torque, and the rated current.

According to the above configuration, the control device controls an energization current for the motor based on the generated torque, the feedback torque, and the rated current. In this case, the electrical angle of the motor can be brought close to the target electrical angle. The target electrical angle is set to an electrical angle at which the generated torque is substantially zero when the motor is energized. Consequently, the generated torque can be reduced. It is possible to suppress fluctuations in the generated torque. Thus, it is possible to suppress vibration generated in the stationary electrified vehicle.

In a second aspect, in addition to the first aspect, when controlling the energization current, the control device may determine a target value for the energization current according to a ratio obtained by dividing a sum of the generated torque and the feedback torque by the generated torque.

The generated torque is proportional to the energization current. Therefore, the magnitude of the generated torque can be adjusted by adjusting the magnitude of the energization current. By adjusting the magnitude of the generated torque, the electrical angle of the motor can be brought close to the target electric angle more quickly. Thus, it is possible to suppress vibration generated in the stationary electrified vehicle more quickly.

A third aspect provides another electrified vehicle including:

a motor that drives wheels of the electrified vehicle;

a battery that supplies power to the motor;

an inverter provided between the battery and the motor to convert direct-current power from the battery to alternating-current power to be supplied to the motor; and a control device that controls operation of the inverter, in which:

the control device is capable of executing specific operation with energization of the motor with the electrified vehicle stopped; and the specific operation includes starting energization of the motor at a predetermined rated current by controlling the operation of the inverter, specifying generated torque generated by the motor based on the rated current and a present value of an electrical angle of the motor, determining feedback torque for suppressing vibration based on an angular velocity of the electrical angle, and controlling an energization current for the motor based on the generated torque, the feedback torque, and the rated current.

According to the above configuration, the control device controls an energization current for the motor based on the generated torque, the feedback torque, and the rated current. In this case, the electrical angle of the motor can be brought close to the electrical angle at which the generated torque is substantially zero when the motor is energized. Consequently, the generated torque can be reduced, and fluctuations in the generated torque can be suppressed. Thus, it is possible to suppress vibration generated in the stationary electrified vehicle.

In a fourth aspect, in addition to the third aspect, when controlling the energization current, the control device may determine a target value for the energization current according to a ratio obtained by dividing a sum of the generated torque and the feedback torque by the generated torque.

The generated torque is proportional to the energization current. Therefore, the magnitude of the generated torque can be adjusted by adjusting the magnitude of the energization current. By adjusting the magnitude of the generated torque, the electrical angle of the motor can be brought close to the target electric angle more quickly. Thus, it is possible to suppress vibration generated in the stationary electrified vehicle more quickly.

In a fifth aspect, in addition to any one of the first to fourth aspects, the specific operation may be battery temperature raising operation for raising a temperature of the battery or neutral point charging operation for charging the battery by connecting an external power source to a neutral point of the motor.

According to the above configuration, it is possible to suppress generation of vibration in the electrified vehicle when the battery temperature raising operation or the neutral point charging operation is performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
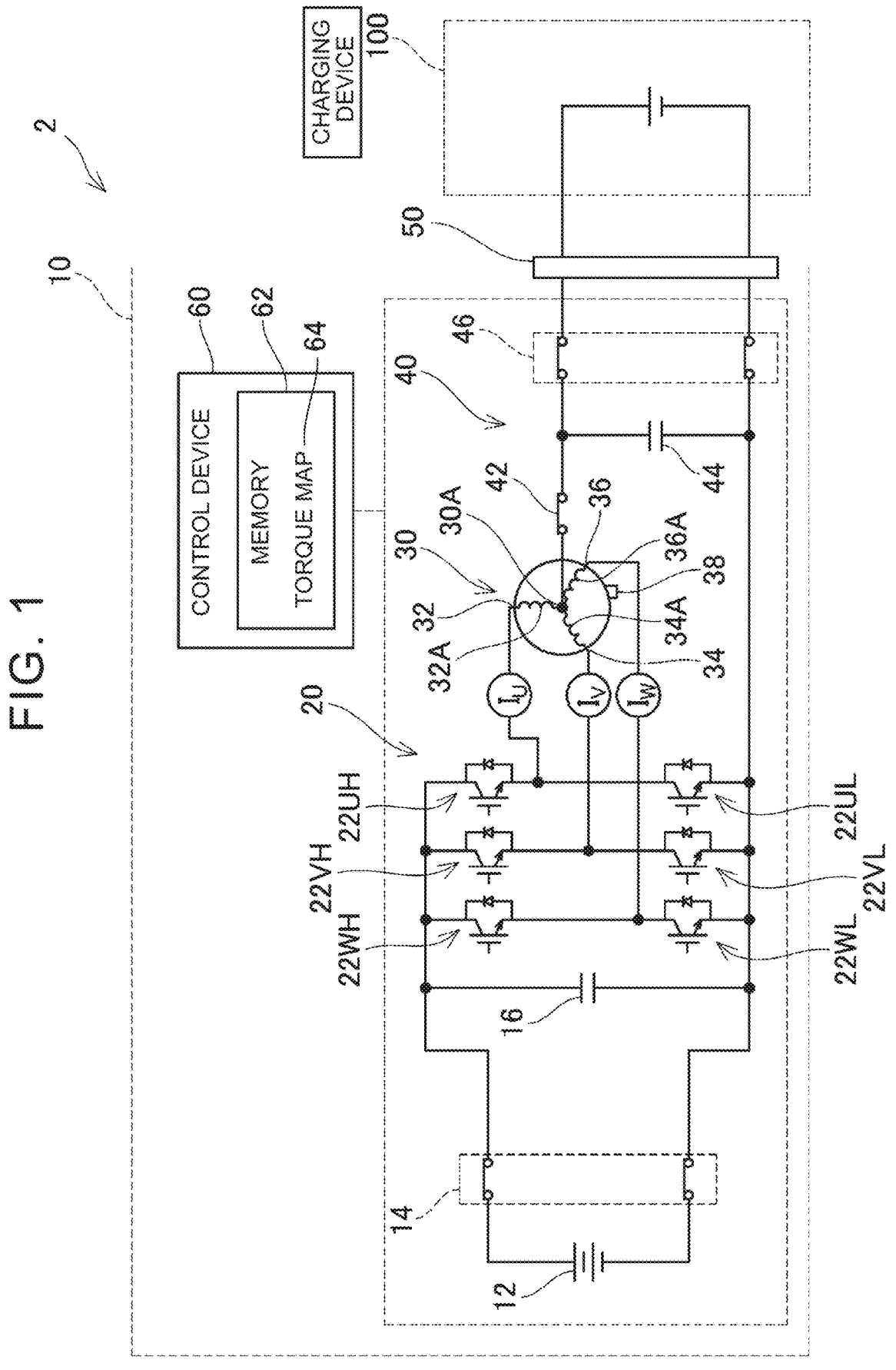
FIG. 1 shows a circuit diagram of a charging system 2.

As illustrated in FIG. 1, the charging device 2 includes a electrified vehicle 10 and a charging device 100. Electrified vehicle 10 includes a battery 12, a system main relay 14, a traveling smoothing capacitor 16, an inverter 20, a motor 30, a charging circuit 40, a charging inlet 50, and a control device 60. The charging inlet 50 is detachably connected to the charging device 100 and receives charging power for charging the battery 12.

The battery 12 includes a plurality of secondary battery cells (not shown), such as lithium ion cells, and is a rechargeable secondary battery configured to be rechargeable and dischargeable repeatedly, and is typically a lithium ion battery. The battery 12 is connected to the inverter 20 via the system main relay 14. The operation of the system main relay 14 is controlled by the control device 60. The traveling smoothing capacitor 16 is provided between the battery 12 and the inverter 20.

The inverter 20 is provided between the traveling smoothing capacitor 16 and the motor 30. The inverter 20 is a device that converts DC power from the battery 12 into AC power. The inverter 20 includes three upper switching elements 22UH, 22VH, 22WH and three lower switching elements 22UL, 22VL, 22WL. Hereinafter, the "switching element" will be referred to as a "SW element". The upper SW elements 22UH, 22VH, 22WH are connected in series to the lower SW elements 22UL, 22VL, 22WL.

A midpoint between the upper SW element 22UH and the lower SW element 22UL connected in series is electrically connected to the U-phase terminal 32 of the motor 30. Thus, the upper SW element 22UH and the lower SW element 22UL constitute a pair of upper and lower U-phase arms that connect the U-phase terminal 32 of the motor 30 to the positive or negative electrode of the battery 12. Similarly, the upper SW element 22VH and the lower SW element 22VL connected in series constitute a pair of upper and lower V-phase arms, and a midpoint therebetween is electrically connected to the V-phase terminal 34 of the motor 30. Further, the upper SW element 22WH and the lower SW element 22WL connected in series constitute a pair of upper and lower W-phase arms, and a midpoint therebetween is electrically connected to the W-phase terminal 36 of the motor 30. The operation of the three lower SW elements 22UL, 22VL, 22WL and the operation of the three lower SW elements 22UL, 22VL, 22WL are controlled by the control device 60.

The motor 30 is a three-phase AC motor that drives the front wheels of electrified vehicle 10 by using electric power supplied from the battery 12. The motor 30 includes a U-phase coil 32A, a V-phase coil 34A, and a W-phase coil 36A. One ends of the U-phase coil 32A, the V-phase coil 34A, and the W-phase coil 36A are connected to the U-phase terminal 32, the V-phase terminal 34, and the W-phase terminal 36, respectively. The other ends of the U-phase coil 32A, the V-phase coil 34A, and the W-phase coil 36A are connected to each other at a neutral point 30A. The motor 30 further includes an electrical angle sensor 38 that detects an electrical angle of a rotor (not shown) of the motor 30.

The charging circuit 40 is a circuit for supplying electric power from the charging device 100 to the battery 12. The charging circuit 40 includes a first charging relay 42, a charging smoothing capacitor 44, and a second charging relay 46. The charging smoothing capacitor 44 is provided between the motor 30 and the charging inlet 50. The first charging relay 42 is provided between the neutral point 30A of the motor 30 and the first charging relay 42. The second charging relay 46 is provided between the charging inlet 50 and the charging smoothing capacitor 44. The operations of the first charging relay 42 and the second charging relay 46 are controlled by the control device 60.

Figure 2:
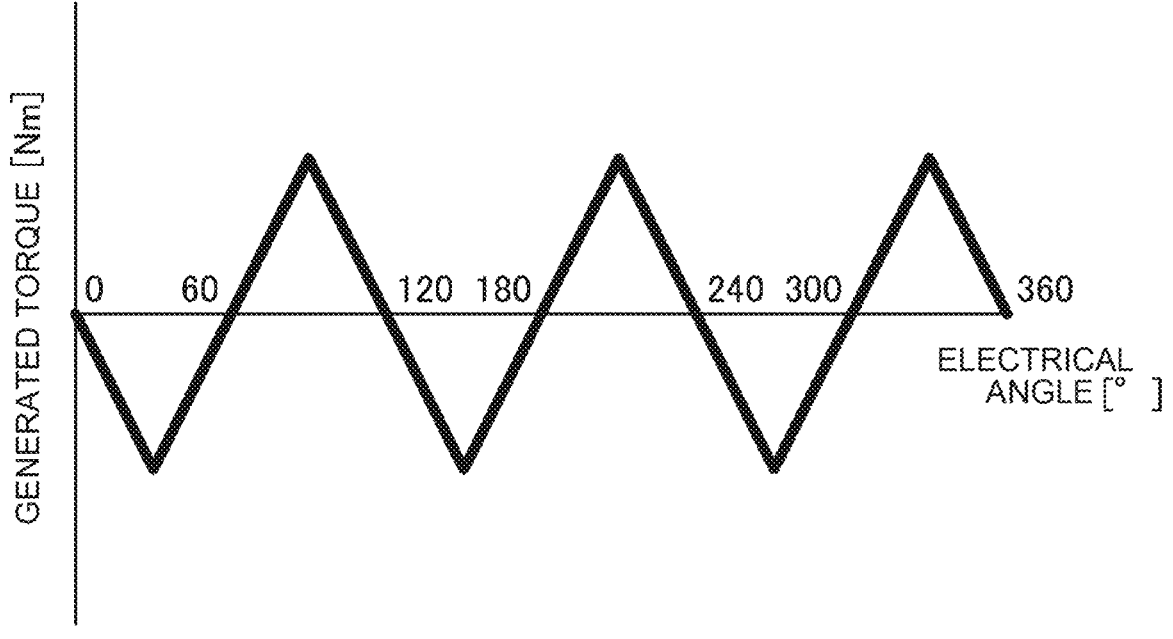
FIG. 2 shows an example of a torque map 64.

The control device 60 is a computer including a CPU. The control device 60 controls the operation of the respective components of electrified vehicle 10. The control device 60 comprises a memory 62 for storing a torque map 64. As illustrated in FIG. 2, the torque map 64 is information indicating a relation between the electric angle [°] of the motor 30 and the generated torque [Nm]. The generated torque is a torque generated in the motor 30 when the motor 30 is energized. The torque map 64 is information used in an energization current control process (FIG. 3) described later. The magnitude of the generated torque is proportional to the value of the current supplied to the motor 30. The torque map 64 corresponds to the rated current Ir of the motor 30 in the neutral point charging operation described later.

The control device 60 of FIG. 1 is configured to be capable of performing a neutral point charge operation with energization to the motor 30 while electrified vehicle 10 is stopped. The neutral point charging operation is an operation for charging the battery 12 by boosting the voltage of the charging power received from the charging device 100. When the charging device 100 is connected to the charging inlet 50 and the voltage (e.g., 400V) of the charging power received from the charging device 100 is lower than the rated voltage (e.g., 800V) of the battery 12, the control device 60 performs a neutral point charging operation.

An outline of the neutral point charging operation will be described. As illustrated in FIG. 1, the control device 60 electrically connects the system main relay 14, the first charging relay 42, and the second charging relay 46. Then, the control device 60 performs the step-up operation to charge the battery 12. Specifically, the control device 60 repeatedly turns on and off at least one of the lower SW elements 22UH, 22VH, 22WH while keeping the upper SW elements 22UL, VL, WL off. The control device 60 controls the duty cycle of the lower SW elements to be turned on and off. Note that the control device 60 may symmetrically turn on and off the upper SW elements 22UL, VL, WL in synchronization with the lower SW elements 22UH, 22VH, 22WH to be repeatedly turned on and off. For example, the lower SW element 22UL is turned on and off. When the lower SW element 22UL is turned on, a current flows through the U-phase coil 32A and the lower SW element 22UL. The U-phase coil 32A stores energy. When the lower SW element 22UL is turned off in this condition, the electric power stored in the U-phase coil 32A is superimposed on the electric power from the charging device 100. As a result, the voltage of the electric power supplied from the inverter 20 to the battery 12 is boosted. Accordingly, the battery 12 is charged.

Figure 3:
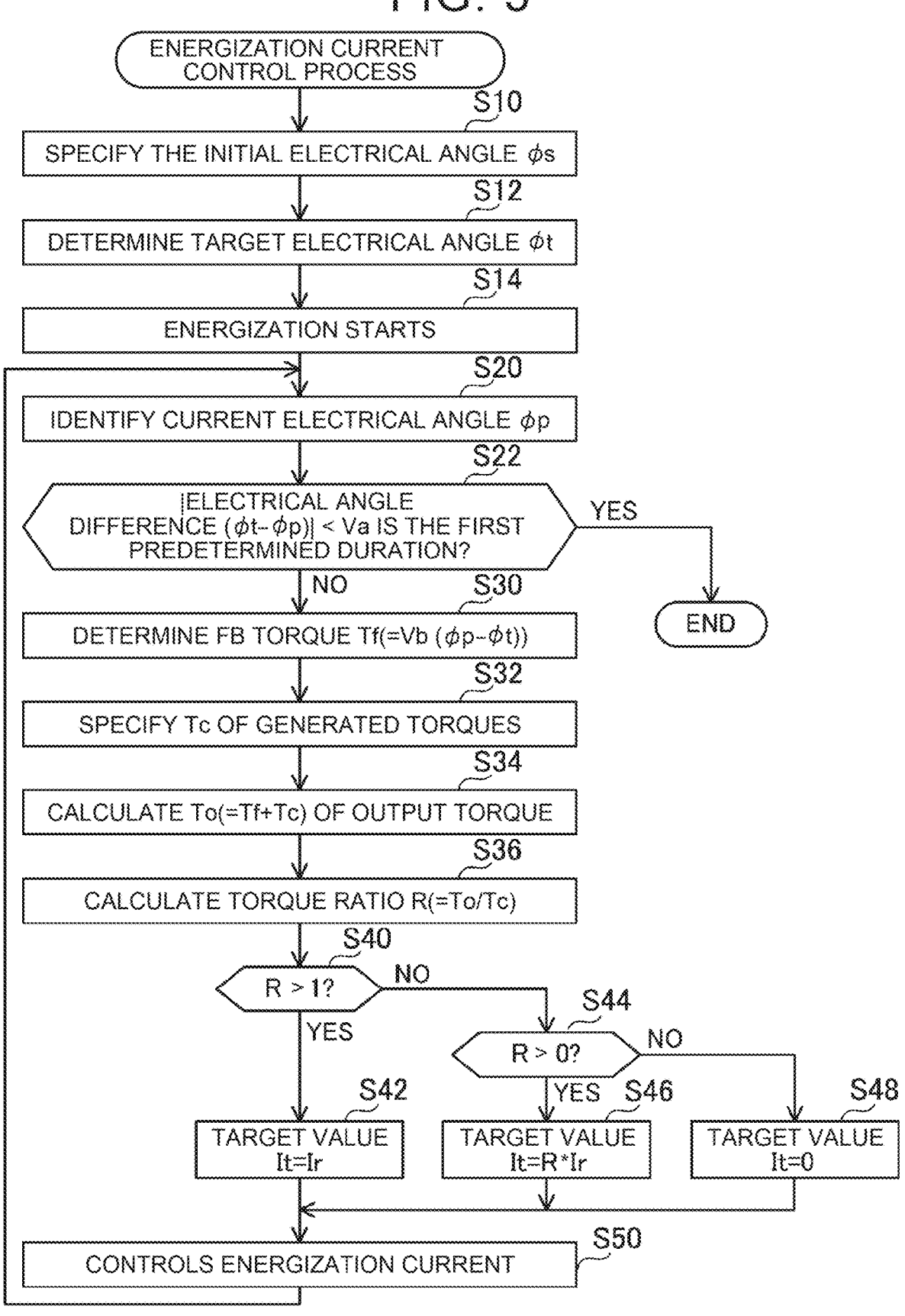
FIG. 3 is a flowchart of an energization current control process according to the first embodiment.

Current Supply Current Control Process; FIG. 3

With reference to FIG. 3, the energization current control process performed during the neutral point charging operation will be described. The energization current control process is a process for controlling the energization current I to be energized to the motor 30 during the neutral point charging operation. At the same time as the start of the neutral point charging operation, the control device 60 starts the processing of FIG. 3.

In S10, the control device 60 specifies the electric angle (hereinafter, referred to as "initial electric angle φs") of the motor 30 at the starting point of the neutral point charging operation. The initial electric angle φs is an initial value of the electric angle of the motor 30.

In S12, the control device 60 determines the target electrical angle φt by using the torque map 64 stored in the memory 62 and the initial electrical angle φs specified by S10. The control device 60 specifies, as the target electrical angle φt, the electrical angle closest to the initial electrical angle φs among the plurality of electrical angles in which the generated torque becomes zero. For example, if the initial electrical angle φs is 110°, then 120° is determined as the target electrical angle φt. In the modified example, the target electric angle φt may be an electric angle in which the generated torque when the motor 30 is energized is equal to or less than a predetermined torque.

In S14, the control device 60 controls the operation of the inverters 20 to initiate energization of the motors 30. The control device 60 determines the rated current Ir as the target value It of the energization current I, and controls the operation of the inverters 20 so as to reach the target value It.

In S20, the control device 60 identifies the present electric angle φp of the motor 30.

In S22, the control device 60 determines whether or not the condition in which the absolute value of the electric angle difference obtained by subtracting the present electric angle φp from the target electric angle φt is less than the first predetermined value Va continues for the first predetermined period or longer. The first predetermined value Va is a positive value. The control device 60 ends the process of FIG. 3 when the state in which the absolute value of the electric angle difference is less than the first predetermined value Va continues for the first predetermined time or longer (YES in S22). After finishing the process of FIG. 3, the control device 60 continues the neutral point charging operation with the rated current Ir as the target value It. On the other hand, when the condition in which the absolute value of the electric angle difference is less than the first predetermined value Va does not continue for the first predetermined period or longer (NO in S22), the control device 60 proceeds to S30.

In S30, the control device 60 determines the feedback torque Tf using the target electrical angle φt and the present electrical angle φp. Hereinafter, the feedback torque is referred to as "FB torque". FB torque Tf is a torque for damping vibrations generated in electrified vehicle 10 while the vehicle is stopped. The control device 60 determines FB torque Tf by multiplying the value obtained by subtracting the target electric angle φt from the present electric angle φp by the second predetermined value Vb. The second predetermined value Vb is a negative value.

In S32, the control device 60 identifies the generated torque Tc by using the rated current Ir, the torque map 64, and the present electric angle φp.

In S34, the control device 60 calculates the output-torque To. The control device 60 calculates the output torque To by adding the generated torque Tc to FB torque Tf.

In S36, the control device 60 calculates a torque ratio R which is a ratio obtained by dividing the output torque To by the generated torque Tc. That is, the torque ratio R is a ratio obtained by dividing the sum of the generated torque Tc and FB torque Tf by the generated torque Tc.

In S40, the control device 60 determines whether or not the torque-ratio R exceeds "1". When the torque-ratio R exceeds "1" (YES in S40), the control device 60 proceeds to S42. On the other hand, when the torque-ratio R is equal to or less than "1" (NO in S40), the control device 60 proceeds to S44.

In S42, the control device 60 determines the rated current Ir as the target value It. When S42 ends, the control device 60 proceeds to S50.

In addition, in S44, the control device 60 determines whether or not the torque-ratio R exceeds "0". When the torque-ratio R exceeds "0" (YES in S44), the control device 60 proceeds to S46. On the other hand, when the torque-ratio R is equal to or less than "0" (NO in S44), the control device 60 proceeds to S48.

In S46, the control device 60 determines a value (R*Ir) obtained by multiplying the rated current Ir by the torque ratio R as the target value It. The target value It is a value less than or equal to the rated current Ir. When S46 ends, the control device 60 proceeds to S50.

In S48, the control device 60 determines the current value "0" as the target value It. When S48 ends, the control device 60 proceeds to S50.

In S50, the control device 60 controls the energization current I so as to reach the determined target value It. When S50 ends, the control device 60 returns to S20.

As described above, the control device 60 executes S30-S50 process until it is determined as YES in S22.

Effects of the energization current control process (see FIG. 3) will be described with reference to FIGS. 4 and 5.

Figure 4:
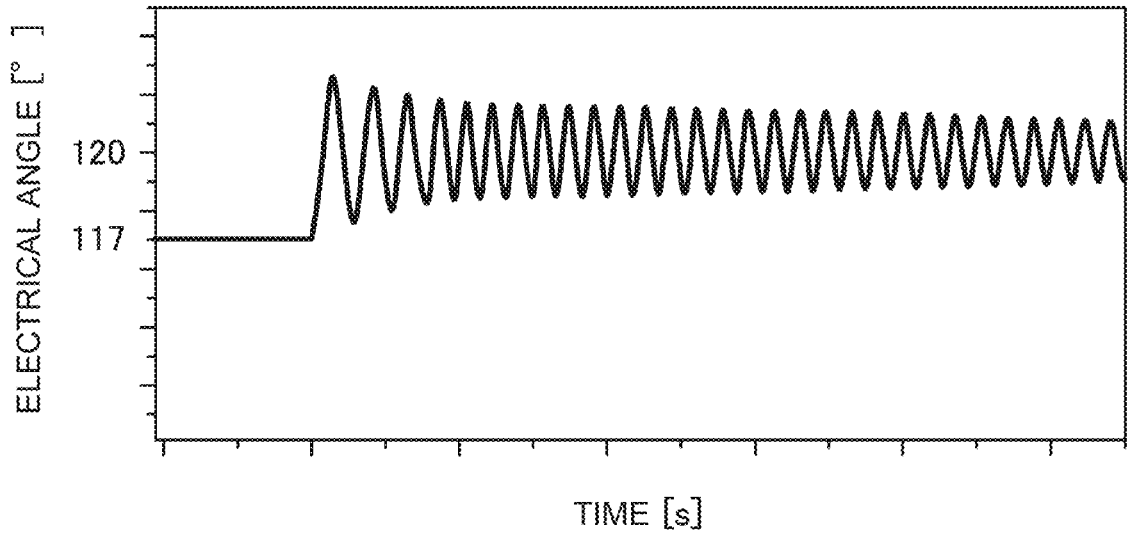
FIG. 4 shows the transition of the electric angle when the neutral point charging operation is performed in electrified vehicle according to the comparative embodiment.
Figure 5:
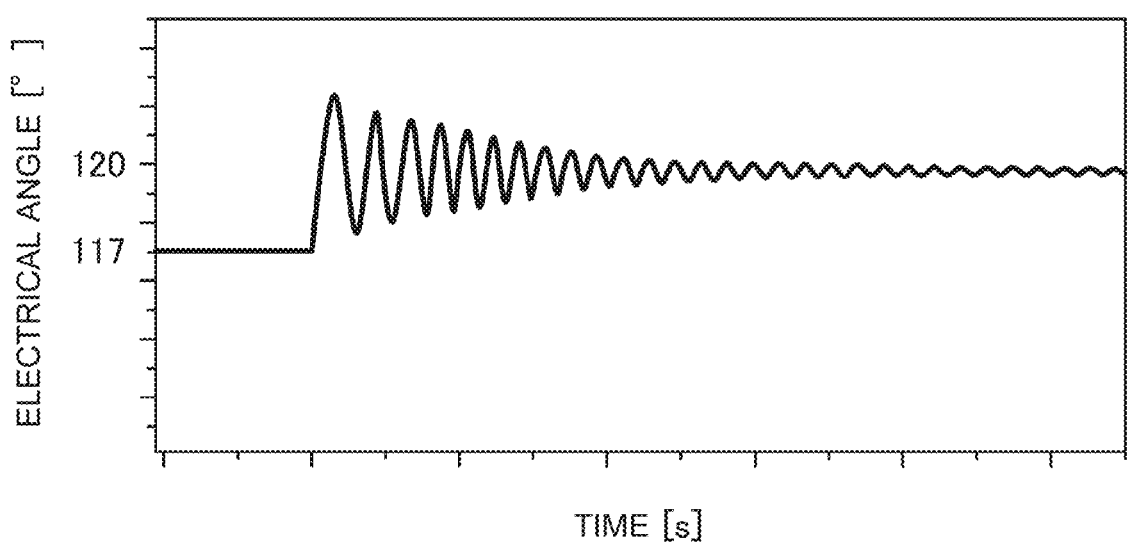
FIG. 5 shows a transition of an electric angle when a neutral point charging operation is performed in electrified vehicle 10 according to the first embodiment.

The vertical axis of the time chart of FIGS. 4 and 5 indicates the electric angle of the motor 30. In the initialization of FIGS. 4 and 5, the electric angle of the motor 30 in the stopped electrified vehicle 10 is 117°. FIG. 4 shows the transition of the electric angle in electrified vehicle of the comparative example, and FIG. 5 shows the transition of the electric angle in electrified vehicle 10 of the present example. Electrified vehicle of the comparative embodiment has the same configuration as that of electrified vehicle 10 except that the energization current control process (see FIG. 3) is not executed.

In FIG. 4, when the neutral point charging operation is started, electrified vehicle of the comparative embodiment starts energizing the motor. As shown in FIG. 2, the generated torque Tc is positive when the electric angle of the motor is 117°. Therefore, as shown in FIG. 4, when energization of the motor is started, a positive generated torque Tc occurs in the motor, and the electric angle of the motor increases. (1) When the electric angle of the motor exceeds 120°, a negative generated torque Tc is generated in the motor. Therefore, the electric angle of the motor is reduced. (2) When the electric angle of the motor is smaller than 120°, a positive generated torque Tc occurs in the motor, and the electric angle of the motor increases. Thereafter, (1) and (2) are repeated. That is, the electric angle of the motor varies approximately around 120°. In response to this, a torque-fluctuation occurs in the motor, and electrified vehicle of the comparative example vibrates. Incidentally, the torque variation of the motor, can also occur tooth strike noise in the drive system of the comparative electrified vehicle.

In FIG. 5, when the neutral point charging operation is started, electrified vehicle 10 identifies the initial electric angle φs (117°) (S10 in FIG. 3), determines 120° as the target electric angle φt (S12), and starts energizing the motor 30 (S14). As in the comparative example of FIG. 4, when the energization of the motor 30 is started, a positive generated torque Tc occurs in the motor 30, and the electric angle of the motor 30 increases. In the energization current control process (see FIG. 3), when the present electric angle φp of the motor 30 is 120° or less, FB torque Tf is positive (S30). Therefore, the torque-ratio R becomes larger than 1 (YES in S40), and the target value It becomes the rated current Ir (S42). When the present electric angle φp is larger than 120°, FB torque Tf becomes negative (S22). Therefore, the torque-ratio R becomes smaller than 1 (YES in NO, S44 in S40). In this case, the torque ratio R is greater than zero. Therefore, the target value It becomes "R*Ir" (S46). Accordingly, the target value It is smaller than the rated current Ir in a situation where the present electric angle φp is larger than 120°. The absolute value of the generated torque Tc of the motor 30 is smaller than the absolute value of the generated torque Tc when the target value It is the rated current Ir. As the absolute value of the generated-torque Tc decreases, the magnitude of the electric angle decreases as compared with the case where the target value It is the rated current Ir. When the electric angle is less than or equal to 120°, the absolute value of the generated torque Tc is also reduced. As described above, as the amplitude of the electric angle decreases, the fluctuation of the electric angle of the motor 30 is suppressed, and the electric angle approaches the target electric angle φt. Consequently, the oscillation of electrified vehicle 10 is damped. In addition, the rattling noise of electrified vehicle 10 drive device is also suppressed.

As described above, electrified vehicle 10 includes the motor 30 that drives the front wheels of electrified vehicle 10 (an exemplary "wheel"), the battery 12 that supplies electric power to the motor 30, the inverter 20, and the control device 60 that controls the operation of the inverter 20. The inverter 20 is provided between the battery 12 and the motor 30, and converts DC power from the battery 12 into AC power. AC power is supplied to the motor 30. The control device 60 is capable of executing a neutral point charging operation (an exemplary "specified operation") accompanied by energization of the motor 30 while electrified vehicle 10 is stopped. The neutral point charge operation includes a step (S12 of FIG. 2) of determining a target electric angle φt based on an initial electric angle φs (an example of "an initial value of an electric angle of a motor"), a step (S14) of starting energization of the motor 30 at a predetermined rated current Ir by controlling the operation of the inverter 20, a step (S32) of specifying a generated torque Tc generated in the motor 30 based on a rated current Ir and a current electric angle φp (an example of "a current value of an electric angle"), a step (S30) of determining a FB torque Tf based on a deviation of a current electric angle φp with respect to a target electric angle φt, and steps (S30 to S50) of controlling an energization current I to the motor 30 based on the generated torque Tc, the FB torque Tf, and the rated current IR.

According to the above configuration, the control device 60 controls the energization current I to be supplied to the motor 30 based on the generated torque Tc, FB torque Tf, and the rated current Ir. In this case, the electric angle of the motor 30 can be made close to the target electric angle φt. In this way, the generated torque Tc can be reduced. It is possible to suppress variation in the generated torques Tc. Therefore, it is possible to suppress electrified vehicle 10 being stopped being vibrated while the neutral point is being charged.

Further, when controlling the energization current I, the control device 60 determines the target value It of the energization current I in accordance with the torque ratio R which is a ratio obtained by dividing the sum of the generated torque Tc and FB torque Tf by the generated torque Tc (S40 to S48).

The generated torque Tc is proportional to the energization current I. Therefore, the magnitude of the generated torque Tc can be adjusted by adjusting the magnitude of the energization current I. By adjusting the magnitude of the generated torque Tc, the electric angle of the motor 30 can be brought closer to the target electric angle φt at an early stage. Therefore, it is possible to suppress vibrations occurring in the stopped electrified vehicle 10 at an earlier stage.

Second Embodiment

Figure 6:
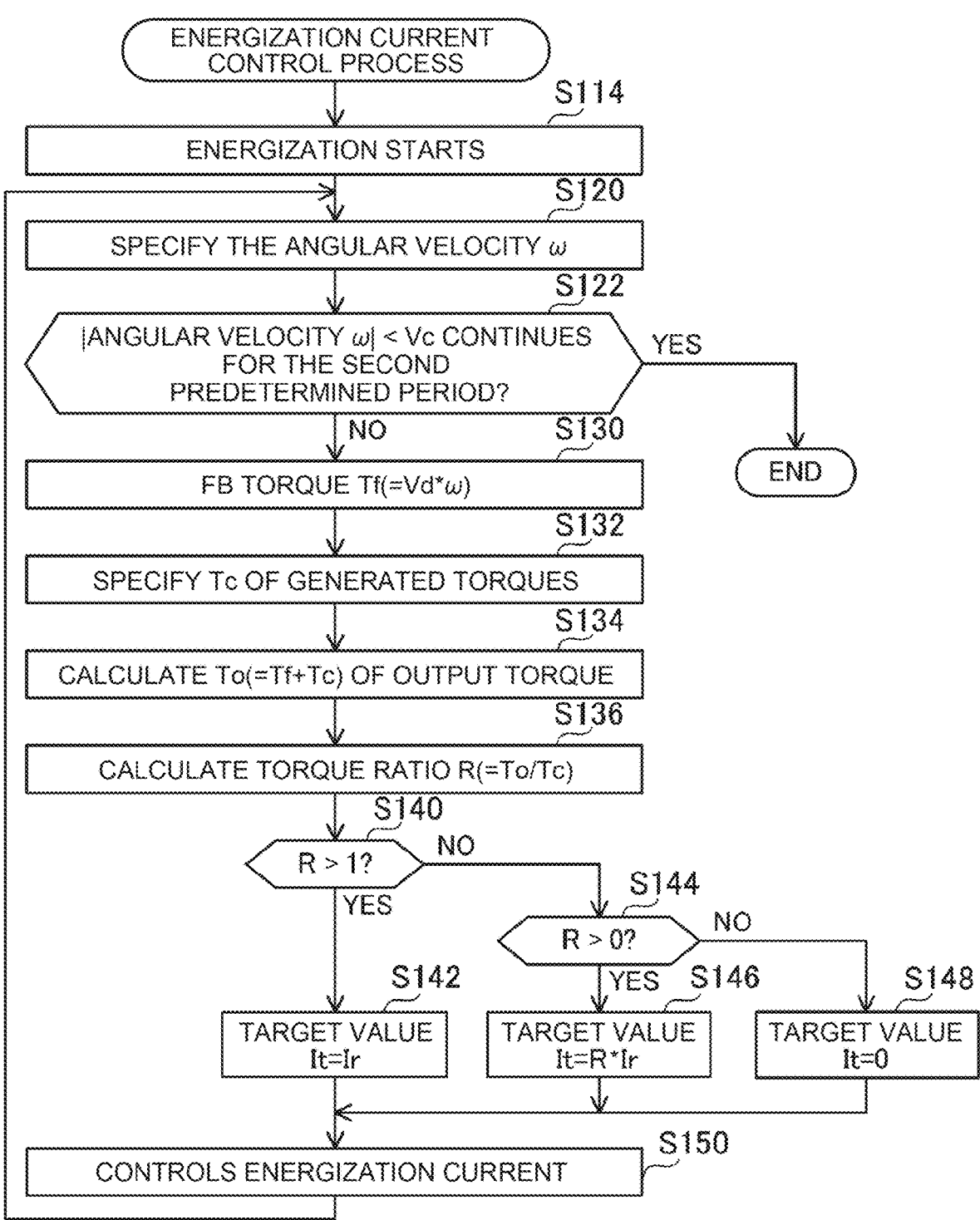
FIG. 6 is a flowchart of an energization current control process according to the second embodiment.

Electrified vehicle 10 of the second embodiment differs from the energization current control process of FIG. 3 in that the energization current control process of FIG. 6 is executed.

Current Supply Current Control Process; FIG. 6

With reference to FIG. 6, the energization current control process performed during the neutral point charging operation will be described. S114 is similar to S14 of FIG. 3.

In S120, the control device 60 specifies the angular velocity ω of the motor 30.

In S122, the control device 60 determines whether or not the condition in which the absolute value of the angular velocity ω is less than the third predetermined value Vc continues for a second predetermined period or longer. The third predetermined value Vc is a positive value. When the state in which the absolute value of the angular velocity ω is less than the third predetermined value Vc continues for the second predetermined time or longer (YES in S122), the control device 60 ends the process of FIG. 6. After finishing the process of FIG. 6, the control device 60 continues the neutral point charging operation with the rated current Ir as the target value It of the energization current I. On the other hand, when the condition in which the absolute value of the angular velocity ω is less than the third predetermined value Vc does not continue for the second predetermined time or longer (NO in S122), the control device 60 proceeds to S130.

In S130, the control device 60 uses the angular velocity ω to determine FB torque Tf. The control device 60 determines FB torque Tf by multiplying the angular velocity ω by the fourth predetermined value Vd. The fourth predetermined value Vd is a negative value.

S132-S150 is Similar to S32-S50 of FIG. 3.

In the present embodiment, by determining FB torque Tf by using the angular velocity ω, the oscillation of electrified vehicle 10 during the neutral point charge operation can be damped.

As described above, electrified vehicle 10 includes the motor 30 that drives the front wheels of electrified vehicle 10, the battery 12 that supplies electric power to the motor 30, the inverter 20, and the control device 60 that controls the operation of the inverter 20. The inverter 20 is provided between the battery 12 and the motor 30, and converts DC power from the battery 12 into AC power. AC power is supplied to the motor 30. The control device 60 is capable of performing a neutral point charge operation with energization of the motor 30 while electrified vehicle 10 is stopped. The neutral point charging operation controls the operation of the inverter 20 to start energizing the motor 30 at a predetermined rated current Ir (S114), based on the rated current Ir and the current angular velocity ω of the motor 30, the generated torque Tc generated in the motor 30 is specified (S132), and based on the current angular velocity ω, FB torque Tf for damping is determined (S130), and based on the generated torque Tc, FB torque Tf, and the rated current Ir, the energization current I to the motor 30 is controlled (S140 to S150).

According to the above configuration, the control device 60 controls the energization current I to be supplied to the motor 30 based on the generated torque Tc, FB torque Tf, and the rated current Ir. In this case, the electric angle of the motor 30 can be made close to the electric angle at which the generated torque when the electric current is supplied to the motor 30 becomes substantially zero. Thus, the generated torque Tc can be reduced, and the generated torque Tc can be suppressed from fluctuating. Therefore, it is possible to suppress vibrations occurring in electrified vehicle 10 during the stop.

Further, when controlling the energization current I, the control device 60 determines the target value It of the energization current I in accordance with the torque ratio R which is a ratio obtained by dividing the sum of the generated torque Tc and FB torque Tf by the generated torque Tc.

The generated torque Tc is proportional to the enertization current I. Therefore, the magnitude of the generated torque Tc can be adjusted by adjusting the magnitude of the energization current I. By adjusting the magnitude of the generated torque Tc, the electric angle of the motor 30 can be brought closer to the target electric angle φt at an early stage. Therefore, it is possible to suppress vibrations occurring in the stopped electrified vehicle 10 at an earlier stage.

Although the specific examples disclosed by the present disclosure have been described in detail above, these are merely examples and do not limit the scope of claims. The techniques described in the claims include various modifications and alternations of the specific example illustrated above. Modifications of the above-described embodiment are listed below.

The control device 60 may be capable of executing a battery temperature raising operation for raising the temperature of the battery 12 while electrified vehicle 10 is stopped. For example, the control device 60 controls the operation of the inverters 20 and the motor 30 in the battery temperature raising operation to superheat the coolant of electrified vehicle 10 drive system. Then, the temperature of the battery 12 is raised by using the heated cooling liquid. In the present modification, the control device 60 executes the energization current control process in FIG. 3 or FIG. 6 in the battery temperature raising operation. According to such a configuration, it is possible to suppress electrified vehicle 10 from vibrating during the battery temperature raising operation.

The technical elements described in the present specification or drawings exhibit technical usefulness alone or in various combinations, and are not limited to the combinations described in the claims at the time of filing. Also, the techniques illustrated in the present specification or the drawings may simultaneously achieve a plurality of objects. Achieving one of these objectives has technical utility.

What is claimed is:

1. An electrified vehicle comprising:
a motor that drives wheels of the electrified vehicle;
a battery that supplies power to the motor;
an inverter provided between the battery and the motor to convert direct-current power from the battery to alternating-current power to be supplied to the motor; and
a control device that controls operation of the inverter, wherein:
the control device is capable of executing specific operation with energization of the motor with the electrified vehicle stopped; and
the specific operation includes
determining a target electrical angle for an electrical angle of the motor based on an initial value of the electrical angle,
starting energization of the motor at a predetermined rated current by controlling the operation of the inverter,
specifying generated torque generated by the motor based on the rated current and a present value of the electrical angle,
determining feedback torque for suppressing vibration based on a deviation of the present value from the target electrical angle, and
controlling an energization current for the motor based on the generated torque, the feedback torque, and the rated current to suppress the vibration of the electric vehicle when stopped, wherein
when controlling the energization current, the control device determines a target value for the energization current according to a ratio obtained by dividing a sum of the generated torque and the feedback torque by the generated torque.

2. An electrified vehicle comprising:
a motor that drives wheels of the electrified vehicle;
a battery that supplies power to the motor;
an inverter provided between the battery and the motor to convert direct-current power from the battery to alternating-current power to be supplied to the motor; and a control device that controls operation of the inverter, wherein:

the control device is capable of executing specific operation with energization of the motor with the electrified vehicle stopped; and the specific operation includes starting energization of the motor at a predetermined rated current by controlling the operation of the inverter, specifying generated torque generated by the motor based on the rated current and a present value of an electrical angle of the motor, determining feedback torque for suppressing vibration based on an angular velocity of the electrical angle, and controlling an energization current for the motor based on the generated torque, the feedback torque, and the rated current to suppress the vibration of the electric vehicle when stopped, wherein when controlling the energization current, the control device determines a target value for the energization current according to a ratio obtained by dividing a sum of the generated torque and the feedback torque by the generated torque.

3. The electrified vehicle according to claim 1, wherein the specific operation is battery temperature raising operation for raising a temperature of the battery or neutral point charging operation for charging the battery by connecting an external power source to a neutral point of the motor.

4. The electrified vehicle according to claim 2, wherein the specific operation is battery temperature raising operation for raising a temperature of the battery or neutral point charging operation for charging the battery by connecting an external power source to a neutral point of the motor.

* * * * *